US008571858B2

(12) United States Patent
Fuchs et al.

(10) Patent No.: US 8,571,858 B2
(45) Date of Patent: Oct. 29, 2013

(54) METHOD AND DISCRIMINATOR FOR CLASSIFYING DIFFERENT SEGMENTS OF A SIGNAL

(75) Inventors: Guillaume Fuchs, Erlangen (DE); Stefan Bayer, Nuremberg (DE); Jens Hirschfeld, Heringen (DE); Juergen Herre, Buckenhof (DE); Jeremie Lecomte, Fürth (DE); Frederik Nagel, Nuremberg (DE); Nikolaus Rettelbach, Nuremberg (DE); Stefan Wabnik, Ilmenau (DE); Yoshikazu Yokotani, Langen (JP)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 9 days.

(21) Appl. No.: 13/004,534

(22) Filed: Jan. 11, 2011

(65) Prior Publication Data

US 2011/0202337 A1 Aug. 18, 2011

Related U.S. Application Data

(63) Continuation of application No. PCT/EP2009/004339, filed on Jun. 16, 2009.

(60) Provisional application No. 61/079,875, filed on Jul. 11, 2008.

(51) Int. Cl.
*G10L 15/00* (2013.01)

(52) U.S. Cl.
USPC ........... 704/231; 704/246; 704/247; 704/251; 704/252

(58) Field of Classification Search
None
See application file for complete search history.

(56) References Cited

U.S. PATENT DOCUMENTS 6,134,518 A 10/2000 Cohen et al.
6,785,645 B2 8/2004 Khalil et al.

(Continued)

FOREIGN PATENT DOCUMENTS

WO WO-0241302 5/2002
WO WO-03046891 6/2003
WO WO-2008031458 3/2008
WO WO2008/071353 A2 6/2008

OTHER PUBLICATIONS

"Extended Adaptive Multi-Rate-Wideband (AMR-WB+) codec; Transcoding functions", 3GPP TS 26.290 V 6.3.0, Technical Specification, Release 6, Jun. 2005, 85 pages.

(Continued)

*Primary Examiner* — Leonard Saint Cyr
(74) *Attorney, Agent, or Firm* — Michael A. Glenn; Perkins Coie LLP

(57) ABSTRACT

For classifying different segments of a signal which has segments of at least a first type and second type, e.g. audio and speech segments, the signal is short-term classified on the basis of the at least one short-term feature extracted from the signal and a short-term classification result is delivered. The signal is also long-term classified on the basis of the at least one short-term feature and at least one long-term feature extracted from the signal and a long-term classification result is delivered. The short-term classification result and the long-term classification result are combined to provide an output signal indicating whether a segment of the signal is of the first type or of the second type.

17 Claims, 6 Drawing Sheets

(56) References Cited

U.S. PATENT DOCUMENTS

| | | | | |
|---|---|---|---|---|
| 2003/0101050 | A1 | 5/2003 | Khalil et al. | |
| 2003/0231775 | A1 * | 12/2003 | Wark | 381/56 |
| 2006/0015327 | A1 | 1/2006 | Gao | |
| 2008/0162121 | A1 * | 7/2008 | Son et al. | 704/201 |
| 2010/0004926 | A1 * | 1/2010 | Neoran et al. | 704/201 |

OTHER PUBLICATIONS

Carey, et al., "A Comparison of Features for Speech, Music Discrimination", IEEE Int'l Conference on Acoustics, Speech and Signal Processing, vol. 1, Mar. 1999, pp. 149-152.

El-Maleh, et al., "Speech/Music Discrimination for Multimedia Applications", Proceedings of IEEE Int'l Conference on Acoustics, Speech and Signal Processing, Jun. 5-9, 2000, 4 pages.

Ezzaidi, et al., "Speech, Music and Songs Discrimination in the Context of Handsets Variability", Proceedings of ICSLP, Sep. 16-20, 2002, 4 pages.

Hermansky, et al., "Perceptually Based Linear Predictive Analysis of Speech", ICASSP, Apr. 1985, pp. 509-512.

ISO/IEC, "Information technology—Generic coding of moving pictures and associated audio information—Part 7: Advanced Audio Coding (AAC)", Int'l Standard 13818-7, Second edition, 2003, 198 pages.

Jelinek, et al., "Robust Signal/Noise Discrimination for Wideband Speech and Audio Coding", Submitted to IEEE Workshop on Speech Coding, Wisconsin, USA, Sep. 2000, pp. 151-153.

Jelinek, et al., "Wideband Speech Coding Advances in VMR-WB Standard", IEEE Transactions on Audio, Speech, and Language Processing, vol. 15, No. 4, May 2007, pp. 1167-1179.

Neuendorf, et al., "Unified Speech and Audio Coding Scheme for High Quality at Low Bitrates", IEEE Int'l Conference on Acoustics, Speech and Signal Processing, Apr. 19-24, 2009, 4 pages.

Ramprashad, Sean , "The Multimode Transform Predictive Coding Paradigm", IEEE Transactions on Speech and Audio Processing, vol. 11, No. 2, Mar. 2003, pp. 117-129.

Tancerel, et al., "Combined Speech and Audio Coding by Discrimination", IEEE Workshop on Speech Coding, Piscataway, NJ, XP010520073, Sep. 2000, pp. 154-156.

Wang, et al., "Real-Time Speech/Music Classification with a Hierarchical Oblique Decision Tree", Proceedings of the IEEE Int'l Conference on Acoustics, Speech and Signal Processing, Las Vegas, NV, Mar. 30-Apr. 4, 2008, 5 pages.

* cited by examiner (ENCODER)

(DECODER)

METHOD AND DISCRIMINATOR FOR CLASSIFYING DIFFERENT SEGMENTS OF A SIGNAL

CROSS-REFERENCE TO RELATED APPLICATIONS

This application is a continuation of copending International Patent Application No. PCT/EP 2009/004339, which was filed on Jun. 16, 2009, which is incorporated herein by reference in its entirety, and additionally claims priority from U.S. Patent Application No. 61/079,875, which was filed on Jul. 11, 2008, which is also incorporated herein in its entirety by reference.

BACKGROUND OF THE INVENTION

The invention relates to an approach for classifying different segments of a signal comprising segments of at least a first type and a second type. Embodiments of the invention relate to the field of audio coding and, particularly, to the speech/music discrimination upon encoding an audio signal.

In the art, frequency domain coding schemes such as MP3 or AAC are known. These frequency-domain encoders are based on a time-domain/frequency-domain conversion, a subsequent quantization stage, in which the quantization error is controlled using information from a psychoacoustic module, and an encoding stage, in which the quantized spectral coefficients and corresponding side information are entropy-encoded using code tables.

On the other hand there are encoders that are very well suited to speech processing such as the AMR-WB+ as described in 3GPP TS 26.290. Such speech coding schemes perform a Linear Predictive filtering of a time-domain signal. Such a LP filtering is derived from a Linear Prediction analysis of the input time-domain signal. The resulting LP filter coefficients are then coded and transmitted as side information. The process is known as Linear Prediction Coding (LPC). At the output of the filter, the prediction residual signal or prediction error signal which is also known as the excitation signal is encoded using the analysis-by-synthesis stages of the ACELP encoder or, alternatively, is encoded using a trans-form encoder, which uses a Fourier transform with an overlap. The decision between the ACELP coding and the Transform Coded eXcitation coding which is also called TCX coding is done using a closed loop or an open loop algorithm.

Frequency-domain audio coding schemes such as the high efficiency-AAC encoding scheme, which combines an AAC coding scheme and a spectral bandwidth replication technique may also be combined to a joint stereo or a multi-channel coding tool which is known under the term "MPEG surround". Frequency-domain coding schemes are advantageous in that they show a high quality at low bit rates for music signals. Problematic, however, is the quality of speech signals at low bit rates.

On the other hand, speech encoders such as the AMR-WB+ also have a high frequency enhancement stage and a stereo functionality. Speech coding schemes show a high quality for speech signals even at low bit rates, but show a poor quality for music signals at low bit rates.

In view of the available coding schemes mentioned above, some of which are better suited for encoding speech and others being better suited for encoding music, the automatic segmentation and classification of an audio signal to be encoded is an important tool in many multimedia applications and may be used in order to select an appropriate process for each different class occurring in an audio signal. The overall performance of the application is strongly dependent on the reliability of the classification of the audio signal. Indeed, a false classification generates mis-suited selections and tunings of the following processes.

FIG. 6 shows a conventional coder design used for separately encoding speech and music dependent on the discrimination of an audio signal. The coder design comprises a speech encoding branch 100 including an appropriate speech encoder 102, for example an AMR-WB+ speech encoder as it is described in "Extended Adaptive Multi-Rate-Wideband (AMR-WB+) codec", 3GPP TS 26.290 V6.3.0, 2005-06, Technical Specification. Further, the coder design comprises a music encoding branch 104 comprising a music encoder 106, for example an AAC music encoder as it is, for example, described in Generic Coding of Moving Pictures and Associated Audio: Advanced Audio Coding. International Standard 13818-7, ISO/IEC JTC1/SC29/WG11 Moving Pictures Expert Group, 1997.

The outputs of the encoders 102 and 106 are connected to an input of a multiplexer 108. The inputs of the encoders 102 and 106 are selectively connectable to an input line 110 carrying an input audio signal. The input audio signal is applied selectively to the speech encoder 102 or the music encoder 106 by means of a switch 112 shown schematically in FIG. 6 and being controlled by a switching control 114. In addition, the coder design comprises a speech/music discriminator 116 also receiving at an input thereof the input audio signal and outputting a control signal to the switch control 114. The switch control 114 further outputs a mode indicator signal on a line 118 which is input into a second input of the multiplexer 108 so that a mode indicator signal can be sent together with an encoded signal. The mode indicator signal may have only one bit indicating that a datablock associated with the mode indicator bit is either speech encoded or music encoded so that, for example, at a decoder no discrimination needs to be made. Rather, on the basis of the mode indicator bit submitted together with the encoded data to the decoder side an appropriate switching signal can be generated on the basis of the mode indicator for routing the received and encoded data to an appropriate speech or music decoder.

FIG. 6 is a traditional coder design which is used to digitally encode speech and music signals applied to line 110. Generally, speech encoders do better on speech and audio encoders do better on music. A universal coding scheme can be designed by using a multi-coder system which switches from one coder to another according to the nature of the input signal. The non-trivial problem here is to design a well-suited input signal classifier which drives the switching element. The classifier is the speech/music discriminator 116 shown in FIG. 6. Usually, a reliable classification of an audio signal introduces a high delay, whereas, on the other hand, the delay is an important factor in real-time applications.

In general, it is desired that the overall algorithmic delay introduced by the speech/music discriminator is sufficiently low to be able to use the switched coders in a real-time application.

FIG. 7 illustrates the delays experienced in a coder design as shown in FIG. 6. It is assumed that the signal applied on input line 110 is to be coded on a frame basis of 1024 samples at a 16 kHz sampling rate so that the speech/music discrimination should deliver a decision ever frame, i.e. every 64 milliseconds. The transition between two encoders is for example effected in a manner as described in WO 2008/071353 A2 and the speech/music discriminator should not significantly increase the algorithmic delay of the switched decoders which is in total 1600 samples without considering the delay needed for the speech/music discriminator. It is further desired to provide the speech/music decision for the same frame where AAC block switching is decided. The situation is depicted in FIG. 7 illustrating an AAC long block 120 having a length of 2048 samples, i.e. the long block 120 comprises two frames of 1024 samples, an ACC short block 122 of one frame of 1024 samples, and an AMR-WB+ superframe 124 of one frame of 1024 samples.

In FIG. 7, the AAC block-switching decision and speech/music decision are taken on the frames 126 and 128 respectively of 1024 samples, which cover the same period of time. The two decisions are taken at this particular position for making the coding able to use at a time transition windows for going properly form one mode to the other one. In consequence, a minimum delay of 512+64 samples is introduces by the two decisions. This delay has to be added to the delay of 1024 samples generated by the 50% overlap form the AAC MDCT which gives a minimal delay of 1600 samples. In a conventional AAC, only the block-switching is present and the delay is exactly 1600 samples. This delay is needed for switching at a time from a long block to short blocks when transients are detected in the frame 126. This switching of transformation length is desirable for avoiding pre-echo artifact. The decoded frame 130 in FIG. 7 represents the first whole frame which can be restituted at the decoder side in any case (long or short blocks).

In a switched coder using AAC as a music encoder, the switching decision coming from a decision stage should avoid adding too much additional delay to the original AAC delay.

The additional delay comes from the lookahead frame 132 which is needed for the signal analysis in the decision stage. At a sampling rate of for example 16 kHz, the AAC delay is 100 ms while a conventional speech/music discriminator uses around 500 ms of lookahead, which will result to a switched coding structure with a delay of 600 ms. The total delay will then be six times that of the original AAC delay.

Conventional approaches as described above are disadvantageous as for a reliable classification of an audio signal a high, undesired delay is introduced so that a need for a novel approach exists for discriminating a signal including segments of different types, wherein an additional algorithmic delay introduced by the discriminator is sufficiently low so that the switched coders may also be used for a real-time application.

J. Wang, et. al. "Real-time speech/music classification with a hierarchical oblique decision tree", ICASSP 2008, IEEE International Conference on Acoustics, Speech and Signal Processing, 2008, Mar. 31, 2008 to Apr. 4, 2008 describes an approach for speech/music classification using short-term features and long term features derived from the same number of frames. These short-term features and long term features are used for classifying the signal, but only limited properties of the short-term features are exploited, for example the reactivity of the classification is not exploited, although it has an important role for most audio coding applications.

SUMMARY

One embodiment of the invention provides a method for classifying different segments of a signal, the signal comprising segments of at least a first type and a second type, the method comprising:

short-term classifying the signal on the basis of at least one short-term feature extracted from the signal and delivering a short-term classification result;

long-term classifying the signal on the basis of at least one short-term feature and at least one long-term feature extracted from the signal and delivering a long-term classification result; and combining the short-term classification result and the long-term classification result to provide an output signal indicating whether a segment of the signal is of the first type or of the second type.

Another embodiment of the invention provides a discriminator, comprising:

a short-term classifier configured to receive a signal and to provide a short-term classification result of the signal on the basis of at least one short-term feature extracted from the signal, the signal comprising segments of at least a first type and a second type;

a long-term classifier configured to receive the signal and to provide a long-term classification result of the signal on the basis of at least one short-term feature and at least one long-term feature extracted from the signal;

a decision circuit configured to combine the short-term classification result and the long-term classification result to provide an output signal indicating whether a segment of the signal is of the first type or of the second type.

Embodiments of the invention provide the output signal on the basis of a comparison of the short-term analysis result to the long-term analysis result.

Embodiments of the invention concern an approach to classify different non-overlapped short time segments of an audio signal either as speech or as non-speech or further classes. The approach is based on the extraction of features and the analysis of their statistics over two different analysis window lengths. The first window is long and looks mainly to the past. The first window is used to get a reliable but delayed decision clue for the classification of the signal. The second window is short and considers mainly the segment processed at the present time or the current segment. The second window is used to get an instantaneous decision clue. The two decision clues are optimally combined, advantageously by using a hysteresis decision which gets the memory information from the delayed clue and the instantaneous information from the instantaneous clue.

Embodiments of the invention use short-term features both in the short-term classifier and in the long-term classifier so that the two classifiers exploit different statistics of the same feature. The short-term classifier will extract only the instantaneous information because it has access only to one set of features. For example, it can exploit the mean of the features. On the other hand, the long-term classifier has access to several sets of features because it considers several frames. As a consequence, the long-term classifier can exploit more characteristics of the signal by exploiting statistics over more frames than the short-term classifier. For example, the long-term classifier can exploit the variance of the features or the evolution of features over the time. Thus, the long-term classifier may exploit more information than the short-term classifier, but it introduces delay or latency. However, the long-term features, despite introducing delay or latency, will make the long-term classification results more robust and reliable. In some embodiments the short-term and long-term classifiers may consider the same short-term features, which may be computed once and used by the both classifiers. Thus, in such an embodiment the long-term classifier may receive the short-term features directly from the short-term classifier.

The new approach thereby permits to get a classification which is robust while introducing a low delay. Other than conventional approaches, embodiments of the invention limit the delay introduced by the speech/music decision while keeping a reliable decision. In one embodiment of the invention, the lookahead is limited to 128 samples, which results of a total delay of only 108 ms.

BRIEF DESCRIPTION OF THE DRAWINGS

Embodiments of the invention will be described below with reference to the accompanying drawings, in which.

DETAILED DESCRIPTION OF THE INVENTION

Figure 1:
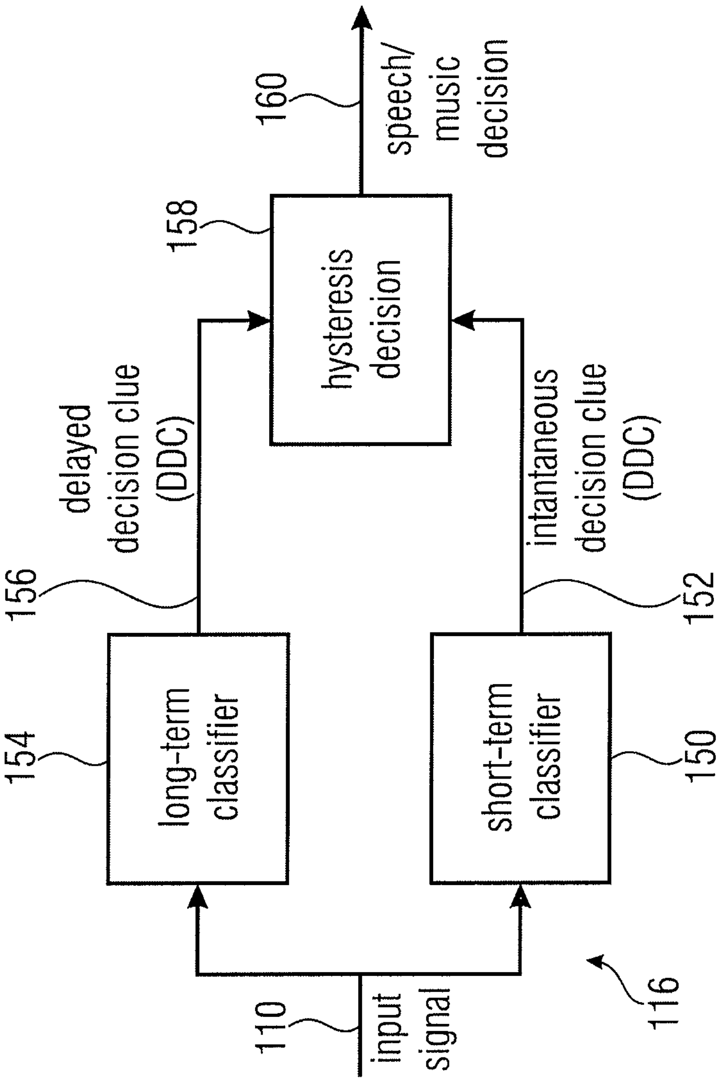
FIG. 1 is a block diagram of a speech/music discriminator in accordance with an embodiment of the invention.

FIG. 1 is a block diagram of a speech/music discriminator 116 in accordance with an embodiment of the invention. The speech/music discriminator 116 comprises a short-term classifier 150 receiving at an input thereof an input signal, for example an audio signal comprising speech and music segments. The short-term classifier 150 outputs on an output line 152 a short-term classification result, the instantaneous decision clue. The discriminator 116 further comprises a long-term classifier 154 which also receives the input signal and outputs on an output line 156 the long-term classification result, the delayed decision clue. Further, an hysteresis decision circuit 158 is provided which combines the output signals from the short-term classifier 150 and the long-term classifier 154 in a manner as will be described in further detail below to generate a speech/music decision signal which is output on line 160 and may be used for controlling the further processing of a segment of an input signal in a manner as is described above with regard to FIG. 6, i.e. the speech/music decision signal 160 may be used to route the input signal segment which has been classified to a speech encoder or to an audio encoder.

Thus, in accordance with embodiments of the invention two different classifiers 150 and 154 are used in parallel on the input signal applied to the respective classifiers via input line 110. The two classifiers are called long-term classifier 154 and short-term classifier 150, wherein the two classifiers differ by analyzing the statistics of the features on which the operate over analysis windows. The two classifiers deliver the output signals 152 and 156, namely the instantaneous decision clue (IDC) and the delayed decision clue (DDC). The short-term classifier 150 generates the IDC on the basis of short-term features that have the aim to capture instant information about the nature of the input signal. They are related to short-term attributes of the signal which can rapidly and at any time change. In consequence the short-term features are expected to be reactive and not to introduce a long delay to the whole discriminating process. For example, since the speech is considered to be quasi-stationary on 5-20 ms durations, the short-term features may be computed every frame of 16 ms on a signal sampled at 16 kHz. The long-term classifier 154 generates the DDC on the basis of features resulting from longer observations of the signal (long-term features) and therefore permits to achieve more reliable classification.

Figure 2:
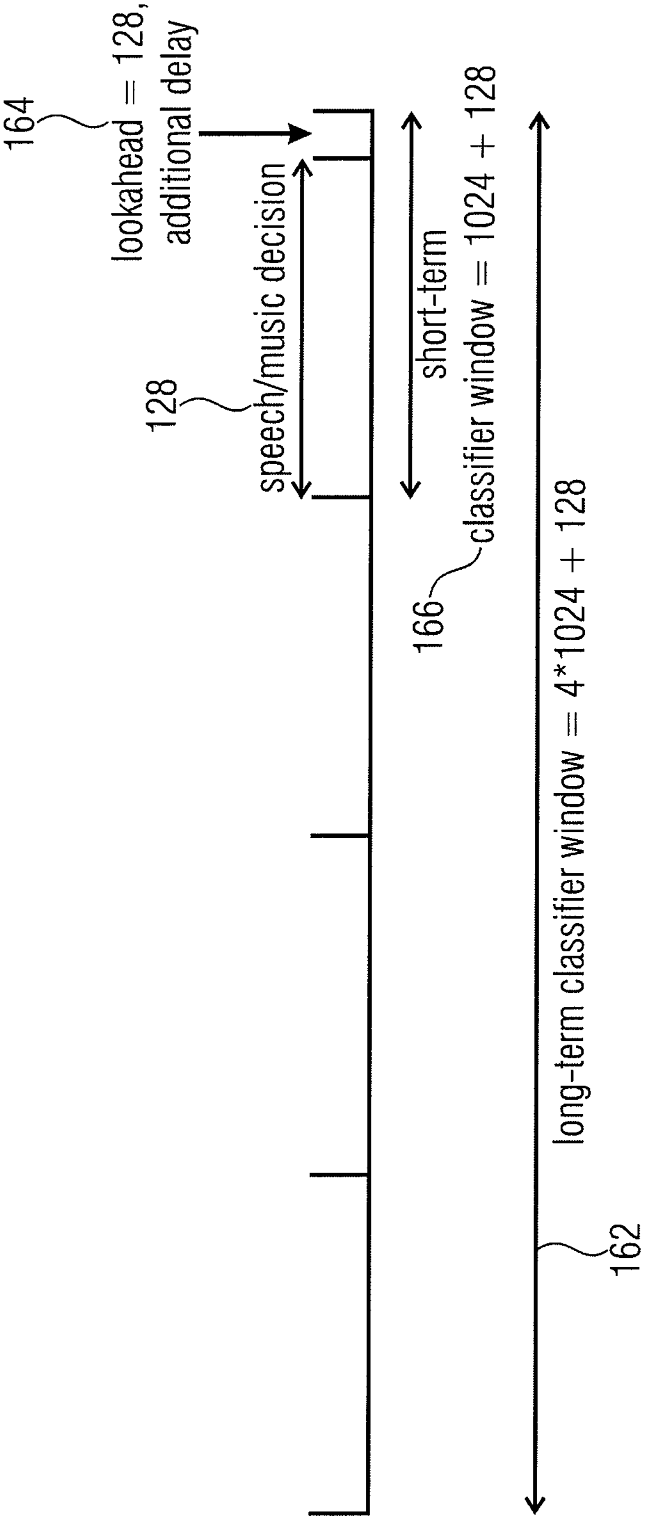
FIG. 2 illustrates the analysis windows used by the long-term and the short-term classifiers of the discriminator of FIG. 1.

FIG. 2 illustrates the analysis windows used by the long-term classifier 154 and the short-term classifier 150 shown in FIG. 1. Assuming a frame of 1024 samples at a sampling rate of 16 kHz the length of the long-term classifier window 162 is 4*1024+128 samples, i.e., the long-term classifier window 162 spans four frames of the audio signal and additional 128 samples are needed by the long-term classifier 154 to make its analysis. This additional delay, which is also referred to as the "lookahead", is indicated in FIG. 2 at reference sign 164. FIG. 2 also shows the short-term classifier window 166 which is 1024+128 samples, i.e. spans one frame of the audio signal and the additional delay needed for analyzing a current segment. The current segment is indicated at 128 as the segment for which the speech/music decision needs to be made.

Figure 6:
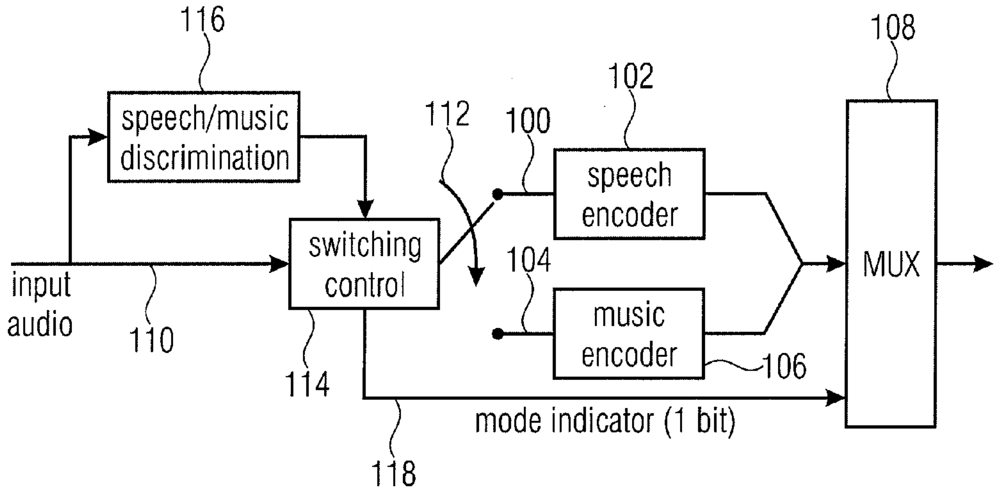
FIG. 6 shows a conventional coder design used for separately encoding speech and music dependent on a discrimination of an audio signal.
Figure 7:
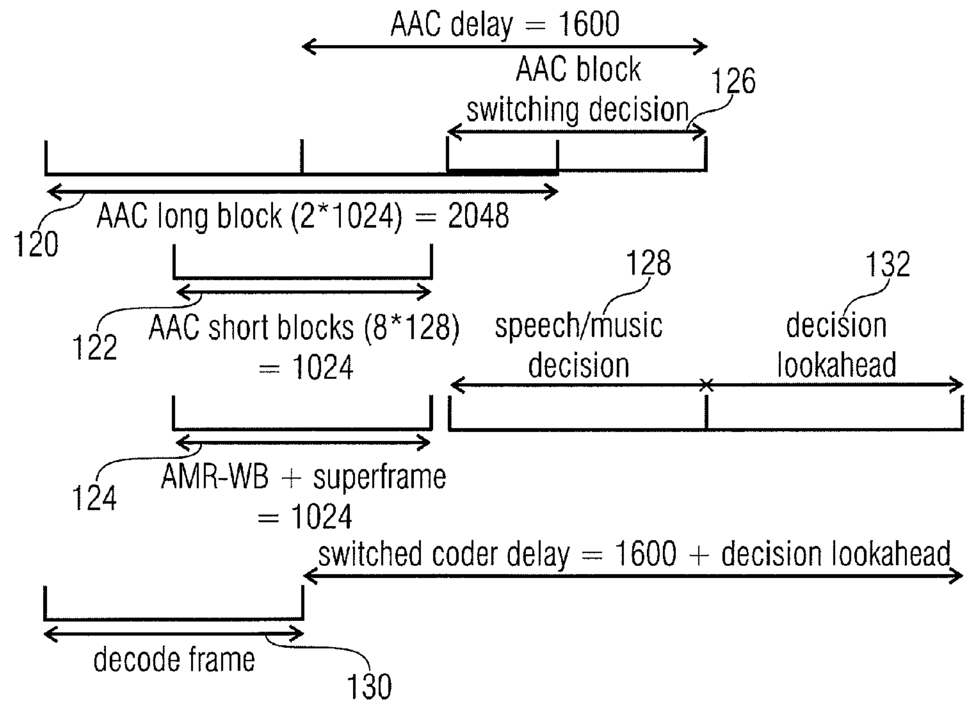
FIG. 7 illustrates the delays experienced in the coder design shown in FIG. 6.

The long-term classifier window indicated in FIG. 2 is sufficiently long to obtain the 4-Hz energy modulation characteristic of speech. The 4-Hz energy modulation is a relevant and discriminate characteristic of speech which is traditionally exploited in robust speech/music discriminators used as for example by Scheirer E. and Slaney M., "Construction and Evaluation of a Robust Multifeature Speech/Music Discriminator", ICASSP'97, Munich, 1997. The 4-Hz energy modulation is a feature which can be only extracted by observing the signal on a long time segment. The additional delay which is introduced by the speech/music discriminator is equal to the lookahead 164 of 128 samples which is needed by each of the classifiers 150 and 154 to make the respective analysis like a perceptual linear prediction analysis as it is described by H. Hermansky, "Perceptive linear prediction (plp) analysis of speech," Journal of the Acoustical Society of America, vol. 87, no. 4, pp. 1738-1752, 1990 and H. Hermansky, et al., "Perceptually based linear predictive analysis of speech," ICASSP 5.509-512, 1985. Thus, when using the discriminator of the above embodiment in an encoder design as shown in FIG. 6, the overall delay of the switched coders 102 and 106 will be 1600+128 samples which equals 108 milliseconds which is sufficiently low for real-time applications.

Figure 3:
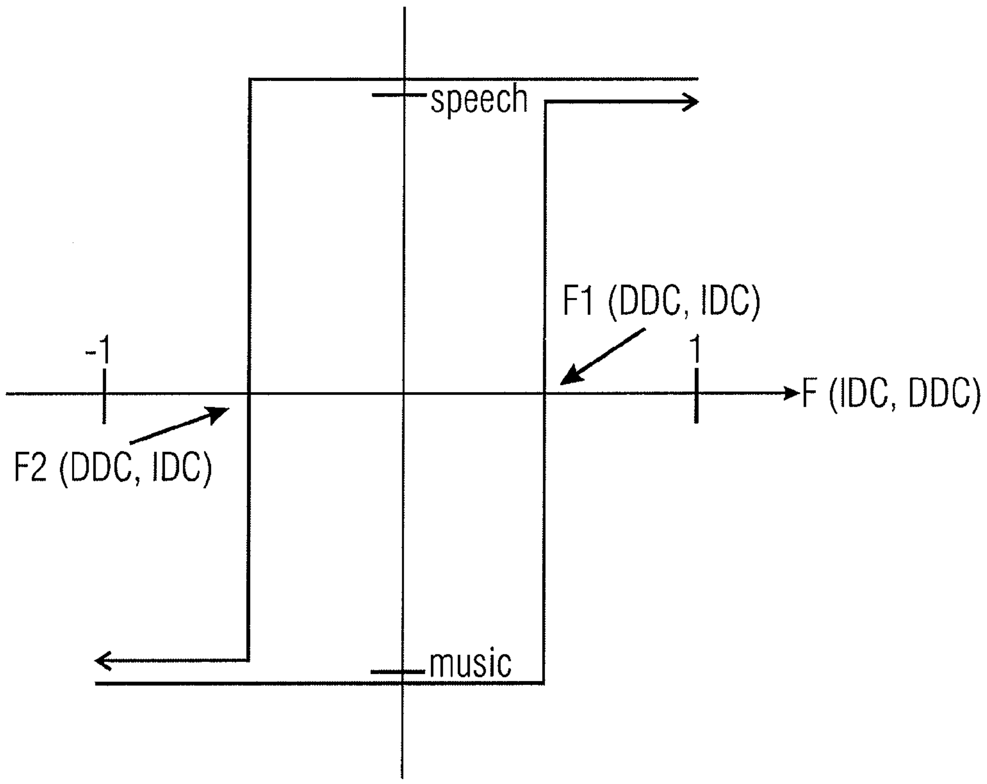
FIG. 3 illustrates the hysteresis decision used in the discriminator of FIG. 1.

Reference is now made to FIG. 3 describing the combining of the output signals 152 and 156 of the classifiers 150 and 154 of the discriminator 116 for obtaining a speech/music decision signal 160. The delayed decision clue DDC and the instantaneous decision clue IDC, in accordance with an embodiment of the invention, are combined by using a hysteresis decision. Hysteresis processes are widely used to post process decisions in order to stabilize them. FIG. 3 illustrates a two-state hysteresis decision as a function of the DDC and the IDC to determine whether the speech/music decision signal should indicate a currently processed segment of the input signal as being a speech segment or a music segment. The characteristic hysteresis cycle is seen in FIG. 3 and IDC and DDC are normalized by the classifiers 150 and 154 in such a way that the values are between −1 and 1, wherein −1 means that the likelihood is totally music-like, and 1 means that the likelihood is totally speech-like.

The decision is based on the value of a function F(IDC, DDC) examples of which will be described below. In FIG. 3, F1(DDC, IDC) indicates a threshold that F(IDC,DDC) should cross to go from a music state to a speech state. F2(DDC,IDC) illustrates a threshold that F(IDC,DDC) should cross to go from the speech state to the music state.

The final decision D(n) for a current segment or current frame having the index n may then be calculated on the basis of the following pseudo code:

```
%Hysteresis Decision Pseudo Code
If(D(n−1)==music)
    If(F(IDC,DDC)<F1(DDC,IDC))
        D(n)==music
    Else
        D(n)==speech
Else
    If(F(IDC,DDC)>F2(DDC,IDC))
        D(n)==speech
    Else
        D(n)==music
%End Hysteresis Decision Pseudo Code
```

In accordance with embodiments of the invention the function F(IDC,DDC) and the above-mentioned thresholds are set as follows:

$$F(\mathrm{IDC,DDC})=\mathrm{IDC}$$

$$F1(\mathrm{IDC,DDC})=0.4\text{-}0.4*\mathrm{DDC}$$

$$F2(\mathrm{IDC,DDC})=-0.4\text{-}0.4*\mathrm{DDC}$$

Alternatively, the following definitions may be used:

$$F(\mathrm{IDC,DDC})=(2*\mathrm{IDC}+\mathrm{DDC})/3$$

$$F1(\mathrm{IDC,DDC})=-0.75*\mathrm{DDC}$$

$$F2(\mathrm{IDC,DDC})=-0.75*\mathrm{DDC}$$

When using the last definition the hysteresis cycle vanishes and the decision is made only on the basis a unique adaptive threshold.

The invention is not limited to the hysteresis decision described above. In the following further embodiments for combining the analysis results for obtaining the output signal will be described.

A simple thresholding can be used instead of the hysteresis decision by making the threshold in a way that it exploits both the characteristics of DDC and IDC. DDC is considered to be a more reliable discriminate clue because it comes from a longer observation of the signal. However, DDC is computed based partly on the past observation of the signal. A conventional classifier which only compares the value DDC to the threshold 0, and by classifying a segment as speech-like when DDC>0 or as music-like otherwise, will have a delayed decision. In one embodiment of the invention, we may adapt the thresholding by exploiting the IDC and make the decision more reactive. For this purpose, the threshold can adapted on the basis of the following pseudo-code:

```
% Pseudo code of adaptive thresholding
If(DDC>−0.5*IDC)
    D(n)==speech
Else
    D(n)==music
%End of adaptive thresholding
```

In another embodiment, the DDC may be used for making more reliable the IDC. The IDC is known to be reactive but not as reliable as DDC. Furthermore, looking to the evolution of the DDC between the past and current segment may give another indication how the frame 166 in FIG. 2 influences the DDC calculated on the segment 162. The notation DDC(n) is used for the current value of the DDC and DDC(n−1) for the past value. Using both values, DDC(n) and DDC(n−1), IDC may be made more reliable by using a decision tree as it is described as follows:

```
% Pseudo code of decision tree
If(IDC>0 && DDC(n)>0)
        D(n)=speech
Else if (IDC<0 && DDC(n)<0)
    D(n)=music
Else if (IDC>0 && DDC(n)−DDC(n−1)>0)
    D(n)=speech
Else if (IDC<0 && DDC(n)−DDC(n−1)<0)
    D(n)=music
Else if (DDC>0)
    D(n)=speech
Else
    D(n)=music
%End of decision tree
```

In above decision tree, the decision is directly taken if the both clues show the same likelihood. If the two clues give contradictory indications, we look at the evolution of the DDC. If the difference DDC(n)-DDC(n−1) is positive, we may suppose that the current segment is speech-like. Otherwise, we may suppose that the current segment is music-like. If this new indication goes to the same direction as the IDC, the final decision is then taken. If the both attempts fail to give a clear decision, the decision is taken by considering only the delayed clue DDC since IDC reliability was not able to be validated.

In the following, the respective classifiers 150 and 154 in accordance with an embodiment of the invention will be described in further detail.

Turning first of all to the long-term classifier 154 it is noted same is for extracting from every sub-frame of 256 samples a set of features. The first feature is the Perceptual Linear Prediction Cepstral Coefficient (PLPCC) as described by H. Hermansky, "Perceptive linear prediction (plp) analysis of speech," Journal of the Acoustical Society of America, vol. 87, no. 4, pp. 1738-1752, 1990 and H. Hermansky, et al., "Perceptually based linear predictive analysis of speech," ICASSP 5.509-512, 1985. PLPCCs are efficient for speaker classification by using human auditory perception estimation. This feature may be used to discriminate speech and music and, indeed permits to distinguish the characteristic formants of the speech as well as the syllabic 4-Hz modulation of the speech by looking to the feature variation over time.

However, to be more robust, the PLPCCs are combined with another feature which is able to capture pitch information, which is another important characteristic of speech and may be critical in coding. Indeed, speech coding relies on the assumption that an input signal is a pseudo mono-periodic signal. The speech coding schemes are efficient for such a signal. On the other hand, the pitch characteristic of speech harms a lot of the coding efficiency of music coders. The smooth pitch delay fluctuation given the natural vibrato of the speech makes the frequency representation in the music coders unable to compact greatly the energy which is needed for obtaining a high coding efficiency.

The following pitch characteristic features may be determined:

Glottal Pulses Energy Ratio:

This feature computes the ratio of energy between the glottal pulses and the LPC residual signal. The glottal pulses are extracted from the LPC residual signal by using a pick-peaking algorithm. Usually, the LPC residual of a voiced segment shows a great pulse-like structure coming from the glottal vibration. The feature is high during voiced segments.

Long-Term Gain Prediction:

It is the gain usually computed in speech coders (see e.g. "Extended Adaptive Multi-Rate-Wideband (AMR-WB+) codec", 3GPP TS 26.290 V6.3.0, 2005-06, Technical Specification) during the long-term prediction. This feature measures the periodicity of the signal and is based on pitch delay estimation.

Pitch Delay Fluctuation:

This feature determines the difference of the present pitch delay estimation when compared to the last sub-frame. For voiced speech this feature should be low but not zero and evolve smoothly.

Once the long-term classifier has extracted the necessitated set of features a statistical classifier is used on these extracted features. The classifier is at first trained by extracting the features over a speech training set and a music training set. The extracted features are normalized to a mean value of 0 and a variance of 1 over both training sets. For each training set, the extracted and normalized features are gathered within a long-term classifier window and modeled by a Gaussians Mixture Model (GMM) using five Gaussians. At the end of the training sequence a set of normalizing parameters and two sets of GMM parameters are obtained and saved.

For each frame to classify, the features are first extracted and normalized with the normalizing parameters. The maximum likelihood for speech (lld_speech) and the maximum likelihood for music (lld_music) are computed for the extracted and normalized features using the GMM of the speech class and the GMM of the music class, respectively. The delayed decision clue DDC is then calculated as follows:

$$DDC=(lld\_speech-lld\_music)/(abs(lld\_music)+abs(lld\_speech))$$

DDC is bound between −1 and 1, and is positive when the maximum likelihood for speech is higher than the maximum likelihood for music, lld_speech>lld_music.

The short-term classifier uses as a short-term feature the PLPCCs. Other than in the long-term classifier, this feature is only analyzed on the window 128. The statistics on this feature are exploited on this short time by a Gaussians Mixture Model (GMM) using five Gaussians. Two models are trained, one for music, and another for speech. It is worth notifying, that the two models are different than the ones obtained for the long-term classifier. For each frame to classify, the PLPCCs are first extracted and the maximum likelihood for speech (lld_speech) and the maximum likelihood for music (lld_music) are computed for using the GMM of the speech class and the GMM of the music class, respectively. The instantaneous decision clue IDC is then calculated as follows:

$$IDC=(lld\_speech-lld\_music)/(abs(lld\_music)+abs(lld\_speech))$$

IDC is bound between −1 and 1.

Thus, the short-term classifier 150 generates the short-term classification result of the signal on the basis of the feature "Perceptual Linear Prediction Cepstral Coefficient (PLPCC)", and the long-term classifier 154 generates the long-term classification result of the signal on the basis of the same feature "Perceptual Linear Prediction Cepstral Coefficient (PLPCC)" and the above mentioned additional feature(s), e.g. pitch characteristic feature(s). Moreover, the long-term classifier can exploit different characteristics of the shared feature, i.e. PLPCCs, as it has access to a longer observation window. Thus, upon combining the short-term and long-term results the short-term features are sufficiently considered for the classification, i.e. its properties are sufficiently exploited.

Below a further embodiment for the respective classifiers 150 and 154 will be described in further detail.

The short-term features analyzed by the short-term classifier in accordance with this embodiment correspond mainly to the Perceptual Linear Perception Cepstral Coefficients (PLPCCs) mentioned above. The PLPCCs are widely used in speech and speaker recognition as well as the MFCCs (see above). The PLPCCs are retained because they share a great part of the functionality of the Linear Prediction (LP) which is used in most of the modern speech coder and so already implemented in a switched audio coder. The PLPCCs can extract the formant structure of the speech as the LP does, but by taking into account perceptual considerations PLPCCs are more speaker independent and thus more relevant regarding the linguistic information. An order of 16 is used on the 16 kHz sampled input signal.

Apart from the PLPCCs, a voicing strength is computed as a short-term feature. The voicing strength is not considered to be really discriminating by itself, but is beneficial in association with the PLPCCs in the feature dimension. The voicing strength permits to draw in the features dimension at least two clusters corresponding respectively to the voiced and the unvoiced pronunciations of the speech. It is based on a merit calculation using different Parameters namely a Zero crossing Counter (zc), the spectral tilt (tilt), the pitch stability (ps), and the normalized correlation of the pitch (nc). All the four parameters are normalized between 0 and 1 in a way that 0 corresponds to a typical unvoiced signal and 1 corresponds to a typical voiced signal. In this embodiment the voicing strength is inspired from the speech classification criteria used in the VMR-WB speech coder described by Milan Jelinek and Redwan Salami, "Wideband speech coding advances in vmr-wb standard," IEEE Trans. on Audio, Speech and Language Processing, vol. 15, no. 4, pp. 1167-1179, May 2007. It is based on an evolved pitch tracker based on autocorrelation. For the frame index k the voicing strength u(k) has the form below:

$$v(k)=\frac{1}{5}(2*nc(k)+2*ps(k)+\mathrm{tilt}(k)+zc(k))$$

The discriminating ability of the short-term features is evaluated by Gaussian Mixture Models (GMMS) as a classifier. Two GMMs, one for the speech class and the other for the music class, are applied. The number of mixtures is made varying in order to evaluate the effect on the performance. Table 1 shows the accuracy rates for the different number of mixtures. A decision is computed for every segment of four successive frames. The overall delay is then equal to 64 ms which is suitable for a switched audio coding. It can be observed that the performance increases with the number of mixtures. The gap between 1-GMMs and 5-GMMs is particularly important and can be explained by the fact that the formant representation of the speech is too complex to be sufficiently defined by only one Gaussian.

TABLE 1

Short-term features classification accuracy in %

| | 1-GMMs | 5-GMMs | 10-GMMs | 20-GMMs |
|---|---|---|---|---|
| Speech | 95.33 | 96.52 | 97.02 | 97.60 |
| Music | 92.17 | 91.97 | 91.61 | 91.77 |
| Average | 93.75 | 94.25 | 94.31 | 94.68 |

Turning now to the long-term classifier 154, it is noted that many works, e.g. M. J. Carey, et. al. "A comparison of features for speech and music discrimination," Proc. IEEE Int. Conf. Acoustics, Speech and Signal Processing, ICASSP, vol. 12, pp. 149 to 152, March 1999, consider variances of statistic features to be more discriminating than the features themselves. As a rough general rule, music can be considered more stationary and exhibits usually lower variance. On the contrary, speech can be easily distinguished by its remarkable 4-Hz energy modulation as the signal periodically changes between voiced and unvoiced segments. Moreover the succession of different phonemes makes the speech features less constant. In this embodiment, two long-term features are considered, one based on a variance computation and the other based on a priori knowledge of the pitch contour of the speech. The long-term features are adapted to the low delay SMD (speech/music discrimination).

The moving variance of the PLPCCs consists of computing the variance for each set of PLPCCs over an overlapping analysis window covering several frames in order to emphasize the last frame. To limit the introduced latency, the analysis window is asymmetric and considers only the current frame and the past history. In a first step, the moving average $ma_m(k)$ of the PLPCCs is computed over the last N frames as described as follows:

$$ma_m(k) = \sum_{i=0}^{N-1} PLPC_m(k-i) \cdot w(i)$$

where PLPm(k) is the mth cepstral coefficient over a total of M coefficients coming from the kth frame. The moving variance $mv_m(k)$ is then defined as:

$$mv_m(k) = \sum_{i=0}^{N-1} (PLPC_m(k-i) - ma_m(k))^2 \cdot w(i)$$

where w is a window of length N which is in this embodiment a ramp slope defined as follows:

$$w(i)=(N-i)/N\cdot(N+1)/2$$

The moving variance is finally averaged over the cepstral dimension:

$$mv(k) = \frac{1}{M}\sum_{m=0}^{M} mv_m(k)$$

The pitch of the speech has remarkably properties and part of them can only be observed on long analysis windows. Indeed the pitch of speech is smoothly fluctuating during the voiced segments but is seldom constant. On the contrary, music exhibits very often constant pitch during the whole duration of a note and abrupt changes during transients. The long-term features encompass this characteristic by observing the pitch contour on a long time segment. A pitch contour parameter pc(k) is defined as:

$$pc(k) = \begin{cases} 0 & \text{if} & |p(k)-p(k-1)| < 1 \\ 0,5 & \text{if} & 1 \le |p(k)-p(k-1)| < 2 \\ 1 & \text{if} & 2 \le |p(k)-p(k-1)| < 20 \\ 0,5 & \text{if} & 20 \le |p(k)-p(k-1)| < 25 \\ 0 & \text{otherwise} & \end{cases}$$

where p(k) is the pitch delay computed at the frame index k on the LP residual signal sampled at 16 Hz. From the pitch contour parameter, a speech merit, sm(k), is computed in a way that speech is expected to display a smoothly fluctuating pitch delay during voiced segments and a strong spectral tilt towards high frequencies during unvoiced segments:

$$sm(k) = \begin{cases} nc(k)\cdot pc(k) & \text{if} \quad v(k) \ge 0.5 \\ (1-nc(k))\cdot(1-\text{tilt}(k)) & \text{otherwise} \end{cases}$$

where nc(k), tilt(k), and v(k) are defined as above (see the short term classifier). The speech merit is then weighted by the window w defined above and integrated over the last N frames:

$$ams(k) = \sum_{i=0}^{N} m(k-1)w(i)$$

The pitch contour is also an important indication that a signal is suitable for a speech or an audio coding. Indeed speech coders work mainly in time domain and make the assumption that the signal is harmonic and quasi-stationary on short time segments of about 5 ms. In this manner they may model efficiently the natural pitch fluctuation of the speech. On the contrary, the same fluctuation harms the efficiency of general audio encoders which exploit linear transformations on long analysis windows. The main energy of the signal is then spread over several transformed coefficients.

As for the short-term features, also the long-term features are evaluated using a statistical classifier thereby obtaining the long-term classification result (DDC). The two features are computed using N=25 frames, e.g. considering 400 ms of past history of the signal. A Linear Discrimant Analysis (LDA) is first applied before using 3-GMMs in the reduced one-dimensional space. Table 2 shows the performance measured on the training and the testing sets when classifying segments of four successive frames.

TABLE 2

Long-term features classification accuracy in %

| | Training Set | Test Set |
|---|---|---|
| Speech | 97.99 | 97.84 |
| Music | 95.93 | 95.44 |
| Average | 96.96 | 96.64 |

The combined classifiers system according to embodiments of the invention combines appropriately the short-term and long-term features in way that they bring their own specific contribution to the final decision. For this purpose a hysteresis final decision stage as described above may be used, where the memory effect is driven by the DDC or long-term discriminating clue (LTDC) while the instant input comes from the IDC or short-term discriminating clue (STDC). The two clues are the outputs of the long-term and short-term classifiers as illustrated in FIG. 1. The decision is taken based on the IDC but is stabilized by the DDC which controls dynamically the thresholds triggering a change of state.

The long-term classifier 154 uses both the long-term and short-term features previously defined with a LDA followed by 3-GMMs. The DDC is equal to the logarithmic ratio of the long-term classifier likelihood of the speech class and the music class computed over the last 4×K frames. The number of frames taken into account may vary with the parameter K in order to add more or less memory effect in the final decision. On the contrary, the short-term classifier uses only the short-term features with 5-GMMs which show a good compromise between performance and complexity. The IDC is equal to the logarithmic ratio of the short-term classifier likelihood of the speech class and the music class computed only over the last 4 frames.

In order to evaluate the inventive approach, especially for a switched audio coding, three different kinds of performances were evaluated. A first performance measurement is the conventional speech against music (SvM) performance. It is evaluated over a large set of music and speech items. A second performance measurement is done on a large unique item having speech and music segments alternating every 3 seconds. The discriminating accuracy is then called speech after/before music (SabM) performance and reflects mainly the reactivity of the system. Finally, the stability of the decision is evaluated by performing the classification on a large set of speech over music items. The mixing between speech and music is done at different levels from one item to another. The speech over music (SoM) performance is then obtained by computing the ratio of the number class switches that occurred over the total number of frames.

The long term classifier and the short-term classifier are used as references for evaluating conventional single classifier approaches. The short-term classifier shows a good reactivity while having lower stability and overall discriminating ability. On the other hand, the long-term classifier, especially by increasing the number of frames 4×K, can reach better stability and discriminating behaviour by compromising the reactivity of the decision. When compared to the just mentioned conventional approach, the performances of the combined classifier system in accordance with the invention has several advantages. One advantage is that it maintains a good pure speech against music discrimination performance while preserving the reactivity of the system. A further advantage is the good trade-off between reactivity and stability.

Figure 4:
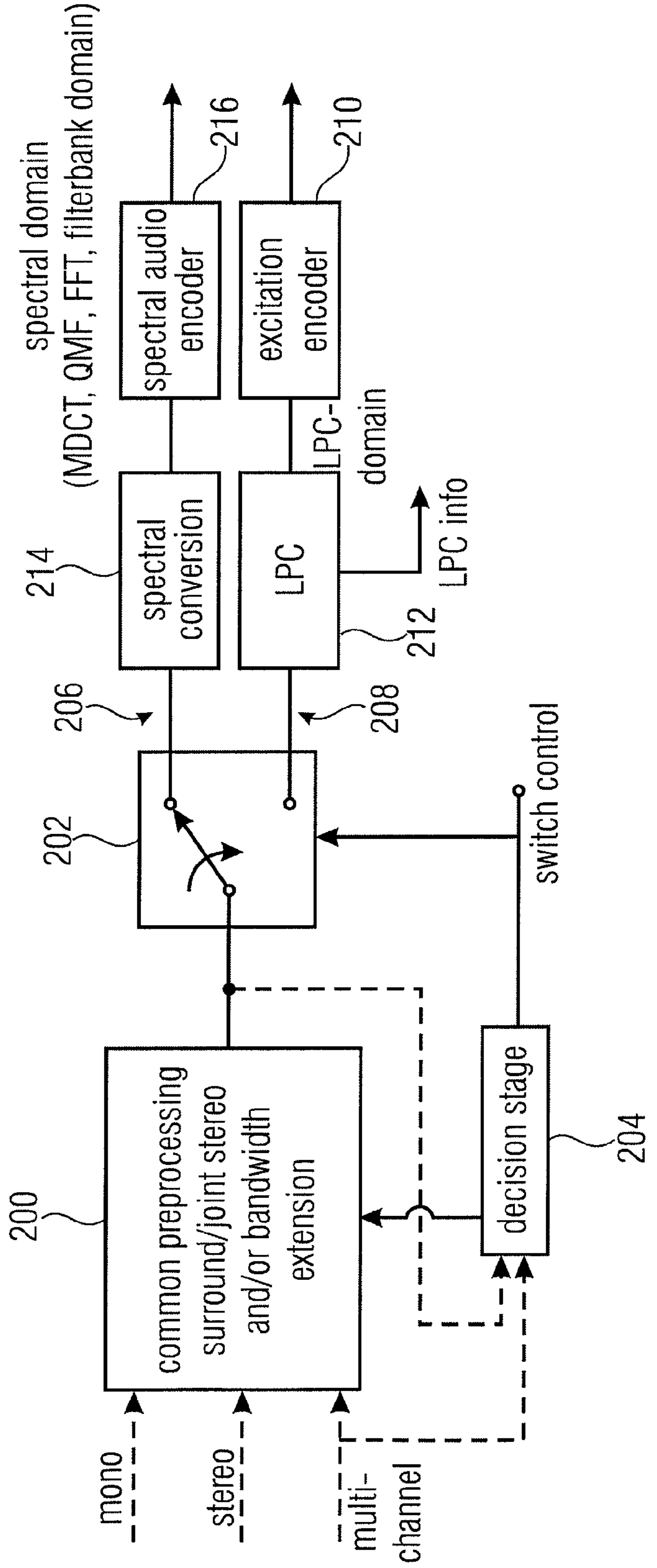
FIG. 4 is a block diagram of an exemplary encoding scheme comprising a discriminator in accordance with embodiments of the invention.
Figure 5:
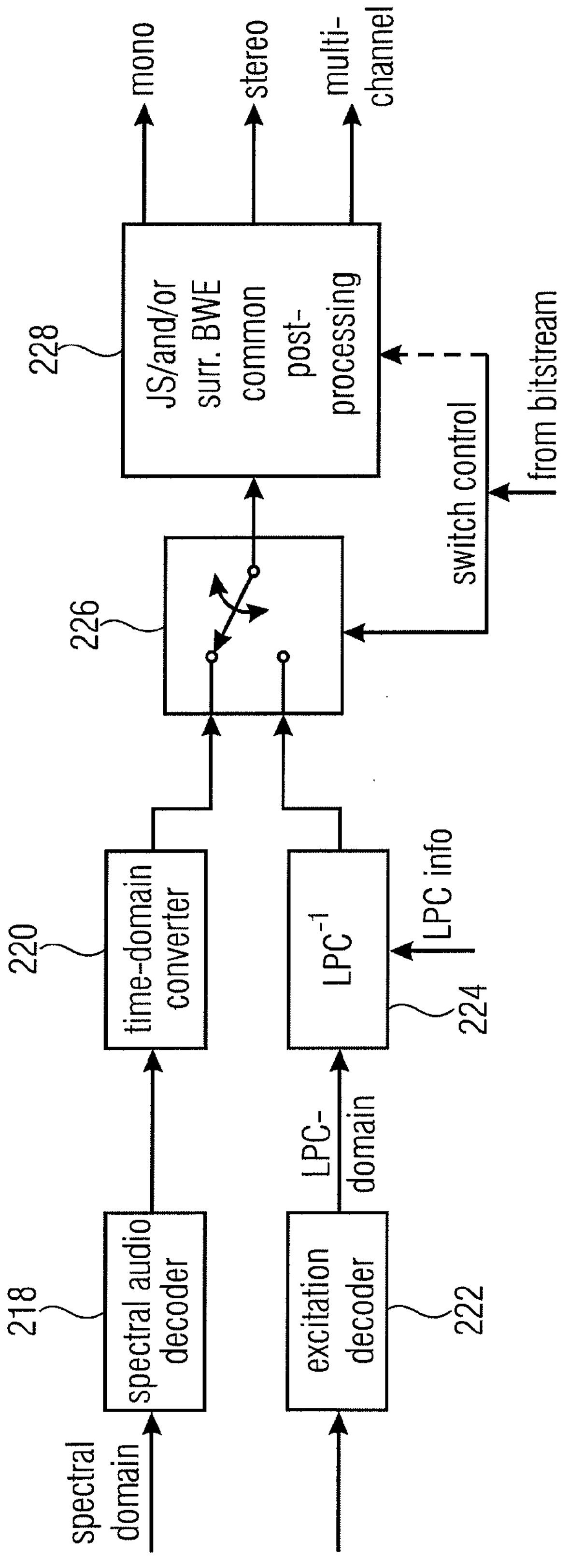
FIG. 5 is a block diagram of a decoding scheme corresponding to the encoding scheme of FIG. 4.

In the following, reference is made to FIGS. 4 and 5 illustrating exemplary encoding and decoding schemes which include a discriminator or decision stage operating in accordance with embodiments of the invention.

In accordance with the exemplary encoding scheme shown in FIG. 4 a mono signal, a stereo signal or a multi-channel signal is input into a common preprocessing stage 200.

The common preprocessing stage 200 may have a joint stereo functionality, a surround functionality, and/or a bandwidth extension functionality. At the output of stage 200 there is a mono channel, a stereo channel or multiple channels which is input into one or more switches 202. The switch 202 may be provided for each output of stage 200, when stage 200 has two or more outputs, i.e., when stage 200 outputs a stereo signal or a multi-channel signal. Exemplarily, the first channel of a stereo signal may be a speech channel and the second channel of the stereo signal may be a music channel. In this case, the decision in a decision stage 204 may be different between the two channels at the same time instant.

The switch 202 is controlled by the decision stage 204. The decision stage comprises a discriminator in accordance with embodiments of the invention and receives, as an input, a signal input into stage 200 or a signal output by stage 200. Alternatively, the decision stage 204 may also receive a side information which is included in the mono signal, the stereo signal or the multi-channel signal or is at least associated with such a signal, where information is existing, which was, for example, generated when originally producing the mono signal, the stereo signal or the multi-channel signal.

In one embodiment, the decision stage does not control the preprocessing stage 200, and the arrow between stage 204 and 200 does not exist. In a further embodiment, the processing in stage 200 is controlled to a certain degree by the decision stage 204 in order to set one or more parameters in stage 200 based on the decision. This will, however not influence the general algorithm in stage 200 so that the main functionality in stage 200 is active irrespective of the decision in stage 204.

The decision stage 204 actuates the switch 202 in order to feed the output of the common preprocessing stage either in a frequency encoding portion 206 illustrated at an upper branch of FIG. 4 or an LPC-domain encoding portion 208 illustrated at a lower branch in FIG. 4.

In one embodiment, the switch 202 switches between the two coding branches 206, 208. In a further embodiment, there may be additional encoding branches such as a third encoding branch or even a fourth encoding branch or even more encoding branches. In an embodiment with three encoding branches, the third encoding branch may be similar to the second encoding branch, but includes an excitation encoder different from the excitation encoder 210 in the second branch 208. In such an embodiment, the second branch comprises the LPC stage 212 and a codebook based excitation encoder 210 such as in ACELP, and the third branch comprises an LPC stage and an excitation encoder operating on a spectral representation of the LPC stage output signal.

The frequency domain encoding branch comprises a spectral conversion block 214 which is operative to convert the common preprocessing stage output signal into a spectral domain. The spectral conversion block may include an MDCT algorithm, a QMF, an FFT algorithm, Wavelet analysis or a filterbank such as a critically sampled filterbank having a certain number of filterbank channels, where the subband signals in this filterbank may be real valued signals or complex valued signals. The output of the spectral conversion block 214 is encoded using a spectral audio encoder 216, which may include processing blocks as known from the AAC coding scheme.

The lower encoding branch 208 comprises a source model analyzer such as LPC 212, which outputs two kinds of signals. One signal is an LPC information signal which is used for controlling the filter characteristic of an LPC synthesis filter. This LPC information is transmitted to a decoder. The other LPC stage 212 output signal is an excitation signal or an LPC-domain signal, which is input into an excitation encoder 210. The excitation encoder 210 may come from any source-filter model encoder such as a CELP encoder, an ACELP encoder or any other encoder which processes a LPC domain signal.

Another excitation encoder implementation may be a transform coding of the excitation signal. In such an embodiment, the excitation signal is not encoded using an ACELP codebook mechanism, but the excitation signal is converted into a spectral representation and the spectral representation values such as subband signals in case of a filterbank or frequency coefficients in case of a transform such as an FFT are encoded to obtain a data compression. An implementation of this kind of excitation encoder is the TCX coding mode known from AMR-WB+.

The decision in the decision stage 204 may be signal-adaptive so that the decision stage 204 performs a music/speech discrimination and controls the switch 202 in such a way that music signals are input into the upper branch 206, and speech signals are input into the lower branch 208. In one embodiment, the decision stage 204 feeds its decision information into an output bit stream, so that a decoder may use this decision information in order to perform the correct decoding operations.

Such a decoder is illustrated in FIG. 5. After transmission, the signal output by the spectral audio encoder 216 is input into a spectral audio decoder 218. The output of the spectral audio decoder 218 is input into a time-domain converter 220. The output of the excitation encoder 210 of FIG. 4 is input into an excitation decoder 222 which outputs an LPC-domain signal. The LPC-domain signal is input into an LPC synthesis stage 224, which receives, as a further input, the LPC information generated by the corresponding LPC analysis stage 212. The output of the time-domain converter 220 and/or the output of the LPC synthesis stage 224 are input into a switch 226. The switch 226 is controlled via a switch control signal which was, for example, generated by the decision stage 204, or which was externally provided such as by a creator of the original mono signal, stereo signal or multi-channel signal.

The output of the switch 226 is a complete mono signal which is subsequently input into a common post-processing stage 228, which may perform a joint stereo processing or a bandwidth extension processing etc. Alternatively, the output of the switch may also be a stereo signal or a multi-channel signal. It is a stereo signal, when the preprocessing includes a channel reduction to two channels. It may even be a multi-channel signal, when a channel reduction to three channels or no channel reduction at all but only a spectral band replication is performed.

Depending on the specific functionality of the common post-processing stage, a mono signal, a stereo signal or a multi-channel signal is output which has, when the common post-processing stage 228 performs a bandwidth extension operation, a larger bandwidth than the signal input into block 228.

In one embodiment, the switch 226 switches between the two decoding branches 218, 220 and 222, 224. In a further embodiment, there may be additional decoding branches such as a third decoding branch or even a fourth decoding branch or even more decoding branches. In an embodiment with three decoding branches, the third decoding branch may be similar to the second decoding branch, but includes an excitation decoder different from the excitation decoder 222 in the second branch 222, 224. In such an embodiment, the second branch comprises the LPC stage 224 and a codebook based excitation decoder such as in ACELP, and the third branch comprises an LPC stage and an excitation decoder operating on a spectral representation of the LPC stage 224 output signal.

In another embodiment, the common preprocessing stage comprises a surround/joint stereo block which generates, as an output, joint stereo parameters and a mono output signal, which is generated by downmixing the input signal which is a signal having two or more channels. Generally, the signal at the output of block may also be a signal having more channels, but due to the downmixing operation, the number of channels at the output of block will be smaller than the number of channels input into block. In this embodiment, the frequency encoding branch comprises a spectral conversion stage and a subsequently connected quantizing/coding stage. The quantizing/coding stage may include any of the functionalities as known from modern frequency-domain encoders such as the AAC encoder. Furthermore, the quantization operation in the quantizing/coding stage may be controlled via a psychoacoustic module which generates psychoacoustic information such as a psychoacoustic masking threshold over the frequency, where this information is input into the stage. Advantageously, the spectral conversion is done using an MDCT operation which, even more advantageous, is the time-warped MDCT operation, where the strength or, generally, the warping strength may be controlled between zero and a high warping strength. In a zero warping strength, the MDCT operation is a straight-forward MDCT operation known in the art. The LPC-domain encoder may include an ACELP core calculating a pitch gain, a pitch lag and/or codebook information such as a codebook index and a code gain.

Although some of the figures illustrate block diagrams of an apparatus, it is noted that these figures, at the same time, illustrate a method, wherein the block functionalities correspond to the method steps.

Embodiments of the invention were described above on the basis of an audio input signal comprising different segments or frames, the different segments or frames being associated with speech information or music information. The invention is not limited to such embodiments, rather, the approach for classifying different segments of a signal comprising segments of at least a first type and a second type can also be applied to audio signals comprising three or more different segment types, each of which is desired to be encoded by different encoding schemes. Examples for such segment types are:

- Stationary/non-stationary segments may be useful for using different filter-banks, windows or coding adaptation. For example a transient should be coded with a fine time resolution filter-bank while a pure sinusoid should be coded by a fine frequency resolution filter-bank.
- Voiced/unvoiced: voiced segments are well handled by speech coder like CELP but for unvoiced segments too much bits are wasted. The parametric coding will be more efficient.
- Silence/active: silence can be coded with fewer bits than active segments.
- Harmonic/non-harmonic: It will beneficial to use for harmonic segments coding using a linear prediction in the frequency domain.

Also, the invention is not limited to the field of audio techniques, rather, the above-described approach for classifying a signal may be applied to other kinds of signals, like video signals or data signals wherein these respective signals include segments of different types which need different processing, like for example:

The present invention may be adapted for all real time applications which need a segmentation of a time signal. For instance, a face detection from a surveillance video camera may be based on a classifier which determine for each pixel of a frame (here a frame corresponds to a picture taken at a time n) if it belongs to the face of a person or not. The classification (i.e., the face segmentation) should be done for each single frames of the video stream. However, using the present invention, the segmentation of the present frame can take into account the past successive frames for getting a better segmentation accuracy taking the advantage that the successive pictures are strongly correlated. Two classifiers can be then applied. One considering only the present frame and another considering a set of frames including present and past frames The last classifier can integrate the set of frames and determine region of probability for the face position. The classifier decision done only on the present frame, will then be compare to the probability regions. The decision may be then validated or modified.

Embodiments of the invention use the switch for switching between branches so that only one branch receives a signal to be processed and the other branch does not receive the signal. In an alternative embodiment, however, the switch may also be arranged after the processing stages or branches, e.g. the audio encoder and the speech encoder, so that both branches process the same signal in parallel. The signal output by one of these branches is selected to be output, e.g. to be written into an output bitstream.

While embodiments of the invention were described on the basis of digital signals, the segments of which were determined by a predefined number of samples obtained at specific sampling rate, the invention is not limited to such signals, rather, it is also applicable to analog signals in which the segment would then be determined by a specific frequency range or time period of the analog signal. In addition, embodiments of the invention were described in combination with encoders including the discriminator. It is noted that, basically, the approach in accordance with embodiments of the invention for classifying signals may also be applied to decoders receiving an encoded signal for which different encoding schemes can be classified thereby allowing the encoded signal to be provided to an appropriate decoder.

Depending on certain implementation requirements of the inventive methods, the inventive methods may be implemented in hardware or in software. The implementation may be performed using a digital storage medium, in particular, a disc, a DVD or a CD having electronically-readable control signals stored thereon, which co-operate with programmable computer systems such that the inventive methods are performed. Generally, the present invention is therefore a computer program product with a program code stored on a machine-readable carrier, the program code being operated for performing the inventive methods when the computer program product runs on a computer. In other words, the inventive methods are, therefore, a computer program having a program code for performing at least one of the inventive methods when the computer program runs on a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

In the above embodiments the signal is described as comprising a plurality of frames, wherein a current frame is evaluated for a switching decision. It is noted that the current segment of the signal which is evaluated for a switching decision may be one frame, however, the invention is not limited to such embodiments. Rather, a segment of the signal may also comprise a plurality, i.e. two or more, frames.

Further, in the above described embodiments both the short-term classifier and the long-term classifier used the same short-term feature(s). This approach may be used for different reasons, like the need to compute the short-term features only once and to exploit same by the two classifiers in different ways which will reduce the complexity of the system, as e.g. the short-term feature may be calculated by one of the short-term or long-term classifiers and provided to the other classifier. Also, the comparison between short-term and long-term classifier results may be more relevant as the contribution of the present frame in the long-term classification result is more easily deduced by comparing it with the short-term classification result since the two classifiers share common features.

The invention is, however, not restricted to such an approach and the long-term classifier is not restricted to use the same short-term feature(s) as the short-term classifier, i.e. both the short-term classifier and the long-term classifier may calculate their respective short-term feature(s) which are different from each other.

While embodiments described above mentioned the use of PLPCCs as short-term feature, it is noted that other features may be considered, e.g. the variability of the PLPCCs.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for classifying different segments of an audio signal, the audio signal comprising speech and music segments, the method comprising:

short-term classifying, by a short-term classifier, the audio signal on the basis of at least one short-term feature extracted from the audio signal to determine whether a current segment of the audio signal is a speech segment or a music segment, and delivering, at an output of the short-term classifier, a short-term classification result indicating that the current segment of the audio signal is a speech segment or a music segment;

long-term classifying, by a long-term classifier, the audio signal on the basis of at least one short-term feature and at least one long-term feature extracted from the audio signal to determine whether a current segment of the audio signal is a speech segment or a music segment, and delivering, at an output of the long-term classifier, a long-term classification result indicating that the current segment of the audio signal is a speech segment or a music segment; and applying the short-term classification result and the long-term classification result to a decision circuit coupled to the output of the short-term classifier and to the output of the long-term classifier, the decision circuit combining the short-term classification result and the long-term classification result to provide an output signal indicating whether the current segment of the audio signal is a speech segment or a music segment.

2. The method of claim 1, wherein combining comprises providing the output signal on the basis of a comparison of the short-term classification result to the long-term classification result.

3. The method of claim 1, wherein the at least one short-term feature is acquired by analyzing a current segment of the audio signal which is to be classified; and the at least one long-term feature is acquired by analyzing the current segment of the audio signal and one or more preceding segments of the audio signal.

4. The method of claim 1, wherein the at least one short-term feature is acquired by analyzing an analysis window of a first length and a first analysis method; and the at least one long-term feature is acquired by analyzing an analysis window of a second length and second analysis method, the first length being shorter than the second length, and the first and second analysis methods being different.

5. The method of claim 4, wherein the first length spans a current segment of the audio signal, the second length spans the current segment of the audio signal and one or more preceding segments of the audio signal, and the first and second lengths comprise an additional period covering an analysis period.

6. The method of claim 1, wherein combining the short-term classification result and the long-term classification result comprises a hysteresis decision on the basis of a combined result, wherein the combined result comprises the short-term classification result and the long-term classification result, each weighted by a predefined weighting factor.

7. The method of claim 1, wherein the audio signal is a digital signal and a segment of the audio signal comprises as predefined number of samples acquired at a specific sampling rate.

8. The method of claim 1, wherein the at least one short-term feature comprises PLPCCs parameters; and the at least one long-term feature comprises pitch characteristic information.

9. The method of claim 1, wherein the short-term feature used for short-term classification and the short-term feature used for long-term classification are the same or different.

10. A method for processing an audio signal comprising speech and music segments, the method comprising:

classifying a current segment of the audio signal, wherein classifying comprises:

short-term classifying, by a short-term classifier, the audio signal on the basis of at least one short-term feature extracted from the audio signal to determine whether a current segment of the audio signal is a speech segment or a music segment, and delivering, at an output of the short-term classifier, a short-term classification result indicating that the current segment of the audio signal is a speech segment or a music segment;

long-term classifying, by a long-term classifier, the audio signal on the basis of at least one short-term feature and at least one long-term feature extracted from the audio signal to determine whether a current segment of the audio signal is a speech segment or a music segment, and delivering, at an output of the long-term classifier, a long-term classification result indicating that the current segment of the audio signal is a speech segment or a music segment; and applying the short-term classification result and the long-term classification result to a decision circuit coupled to the output of the short-term classifier and to the output of the long-term classifier, the decision circuit combining the short-term classification result and the long-term classification result to provide an output signal indicating whether the current segment of the audio signal is a speech segment or a music segment;

dependent on the output signal provided by the classifying step, processing the current segment in accordance with a first process or a second process; and outputting the processed segment.

11. The method of claim 10, wherein the segment is processed by a speech encoder when the output signal indicates that the segment is a speech segment; and the segment is processed by a music encoder when the output signal indicates that the segment is a music segment.

12. The method of claim 11, further comprising:

combining the encoded segment and information from the output signal indicating the type of the segment.

13. A computer program product for performing, when running on a computer, the method of processing an audio signal comprising speech and music segments, the method comprising:

classifying a current segment of the audio signal, wherein classifying comprises:

short-term classifying, by a short-term classifier, the audio signal on the basis of at least one short-term feature extracted from the audio signal to determine whether a current segment of the audio signal is a speech segment or a music segment, and delivering, at an output of the short-term classifier, a short-term classification result indicating that the current segment of the audio signal is a speech segment or a music segment;

long-term classifying, by a long-term classifier, the audio signal on the basis of at least one short-term feature and at least one long-term feature extracted from the audio signal to determine whether a current segment of the audio signal is a speech segment or a music segment, and delivering, at an output of the long-term classifier, a long-term classification result indicating that the current segment of the audio signal is a speech segment or a music segment; and applying the short-term classification result and the long-term classification result to a decision circuit coupled to the output of the short-term classifier and to the output of the long-term classifier, the decision circuit combining the short-term classification result and the long-term classification result to provide an output signal indicating whether the current segment of the audio signal is a speech segment or a music segment;

dependent on the output signal provided by the classifying step, processing the current segment in accordance with a first process or a second process; and outputting the processed segment.

14. A discriminator, comprising:

a short-term classifier configured to receive an audio signal and to determine whether a current segment of the audio signal is a speech segment or a music segment, the short-term classifier comprising an output to provide a short-term classification result of the audio signal on the basis of at least one short-term feature extracted from the audio signal, the short-term classification result indicating that the current segment of the audio signal is a speech segment or a music segment, the audio signal comprising speech and music segments;

a long-term classifier configured to receive a audio signal and to determine whether a current segment of the audio signal is a speech segment or a music segment, the long-term classifier comprising an output to provide a long-term classification result of the audio signal on the basis of at least one short-term feature and at least one long-term feature extracted from the audio signal, the long-term classification result indicating that the current segment of the audio signal is a speech segment or a music segment; and a decision circuit coupled to the output of the short-term classifier and to the output of the long-term classifier for receiving the short-term classification result and the long-term classification result, the decision circuit configured to combine the short-term classification result and the long-term classification result to provide an output signal indicating whether the current segment of the audio signal is a speech segment or a music segment.

15. The discriminator of claim 14, wherein the decision circuit configured to provide the output signal on the basis of a comparison of the short-term classification result to the long-term classification result.

16. An audio signal processing apparatus, comprising:

a input configured to receive a audio signal to be processed, wherein the audio signal comprises speech and music segments;

a first processing stage, configured to process speech segments;

a second processing stage configured to process music segments;

a discriminator comprising:

a short-term classifier configured to receive an audio signal and to determine whether a current segment of the audio signal is a speech segment or a music segment, the short-term classifier comprising an output to provide a short-term classification result of the audio signal on the basis of at least one short-term feature extracted from the audio signal, the short-term classification result indicating that the current segment of the audio signal is a speech segment or a music segment, the audio signal comprising speech and music segments;

a long-term classifier configured to receive a audio signal and to determine whether a current segment of the audio signal is a speech segment or a music segment, the long-term classifier comprising an output to provide a long-term classification result of the audio signal on the basis of at least one short-term feature and at least one long-term feature extracted from the audio signal, the long-term classification result indicating that the current segment of the audio signal is a speech segment or a music segment; and a decision circuit coupled to the output of the short-term classifier and to the output of the long-term classifier for receiving the short-term classification result and the long-term classification result, the decision circuit configured to combine the short-term classification result and the long-term classification result to provide an output signal indicating whether the current segment of the audio signal is a speech segment or a music segment coupled to the input; and a switching device coupled between the input and the first and second processing stages and configured to apply the audio signal from the input to one of the first and second processing stages dependent on the output signal from the discriminator.

17. An audio encoder, comprising:

an audio signal processing apparatus comprising:

a input configured to receive a audio signal to be processed, wherein the audio signal comprises speech and music segments;

a first processing stage, configured to process speech segments;

a second processing stage configured to process music segments;

a discriminator comprising:

a short-term classifier configured to receive an audio signal and to determine whether a current segment of the audio signal is a speech segment or a music segment, the short-term classifier comprising an output to provide a short-term classification result of the audio signal on the basis of at least one short-term feature extracted from the audio signal, the short-term classification result indicating that the current segment of the audio signal is a speech segment or a music segment, the audio signal comprising speech and music segments;

a long-term classifier configured to receive a audio signal and to determine whether a current segment of the audio signal is a speech segment or a music segment, the long-term classifier comprising an output to provide a long-term classification result of the audio signal on the basis of at least one short-term feature and at least one long-term feature extracted from the audio signal, the long-term classification result indicating that the current segment of the audio signal is a speech segment or a music segment; and a decision circuit coupled to the output of the short-term classifier and to the output of the long-term classifier for receiving the short-term classification result and the long-term classification result, the decision circuit configured to combine the short-term classification result and the long-term classification result to provide an output signal indicating whether the current segment of the audio signal is a speech segment or a music segment coupled to the input; and a switching device coupled between the input and the first and second processing stages and configured to apply the audio signal from the input to one of the first and second processing stages dependent on the output signal from the discriminator, wherein the first processing stage comprises a speech encoder and the second processing stage comprises a music encoder.

* * * * *